United States Patent Office 3,142,570
Patented July 28, 1964

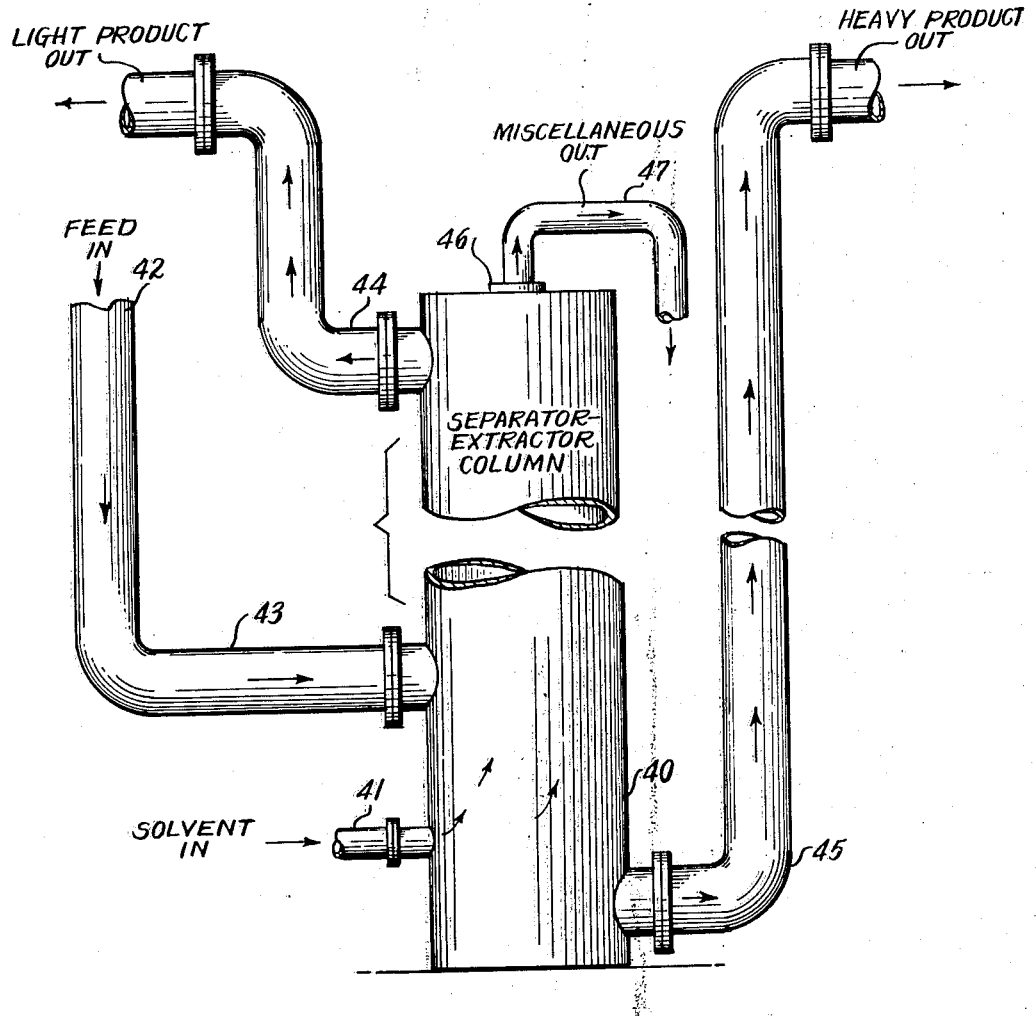

3,142,570
SEPARATION PROCESS
John E. Thompson, P.O. Box 2023, Chicago 9, Ill.
Filed Dec. 31, 1962, Ser. No. 248,810
3 Claims. (Cl. 99—7)

This invention relates to the separation of products such as dry rendered tankage into its various constituents.

When a fat containing material is so treated as to remove the fat, a solid product is obtained. One method is by rendering, and the solid product obtained is known as dry rendered tankage. For purposes of illustration in this application dry rendered tankage is used, but this invention is not limited to this specific material as all types of solid material remaining after the removal of the fat from fat containing materials are usable.

Heretofore dry rendered tankage has been disposed of by slaughter houses just as it is separated from the rendered fat and has been sold on a protein basis.

This invention has for its object the separation of the proteinaceous material, the bone and the fat into three separate constituents from dry rendered tankage.

It is another object of this invention to separate any extraneous impurity, such as hair, sawdust or metal scraps from the light and the heavy constituents of the dry rendered tankage.

It is still a further object of this invention to obtain from dry rendered tankage proteinaceous constituents thereof that may be used to increase the protein value of certain animal foods.

The various features of novelty which characterize this invention are pointed out with particularity in the claims annexed to and forming part of this specification. For a better understanding of the invention, however, its advantages and specific objects obtained with its use, reference should be had to the accompanying drawing and descriptive matter in which have been illustrated and described the preferred embodiment of the invention.

In the drawing, the figure is a flow diagram of the preferred embodiment of this invention.

When fat is rendered the solid material that separates therefrom is removed, and comprises a light portion and a heavy portion, as well as the retained fat adhering thereto. A typical analysis of such material as obtained from a sample of cracklings produced by a meat packer, comprises a solid material containing approximately 25% bone meal, 55% protein, 10% fat and 10% moisture. On solvent extraction the fat may be removed and would include any component which is extractable by the solvent used, that is, color bodies, mineral oil, etc. The light solids, mostly dried soft tissue would be high in protein when obtained from good quality dry rendered tankage. It would also include any light contaminant or adulterant that might be in the raw material, that is hair or sawdust. The heavy solids, mostly bone, when obtained from good dry rendered tankage would include contaminants or adulterants of high density, such as sand, glass, metal scraps, etc. The dry rendered tankage is first run through a hammer mill or treated by other methods for subdividing material so that it will give a product that will pass through a 10 mesh screen and be retained on a 20 mesh screen.

The preferred embodiment of this invention is shown in the figure. The solvent used in this invention may be a light petroleum fraction and is lighter in density than either the light constituents or the heavy constituents. When the finely divided dry rendered tankage is suspended in a solvent of this type the heavy constituents will settle at a greater rate than the lighter constituents. By controlling the flow so that the flow upwardly in a tower is greater than the rate of settling of the lighter constituents and less than the rate of settling of the heavy constituents the separation of these two fractions may be accomplished.

In order to illustrate this method of separation a tower 40 in the figure has the solvent admitted through the conduit 41 in the side thereof and the solvent flows upwardly through this tower at a predetermined rate. The finely divided dry rendered tankage with some of the solvent as a slurry is admitted through the inlet 42 to the conduit 43 into the tank 40 intermediate its end. As pointed out above the flow in this tank carries the light constituents upwardly in the tank, and they are removed from the top thereof through the conduit 44 and carried to a separation unit not shown. The heavy constituents settle to the bottom of the tank as their rate of settling is greater than the rate of flow, and are removed through the conduit 45 near the bottom of the tank, and are carried by means of this conduit to a separation unit not shown. Certain impurities lighter than the solvent would have a tendency to collect in the top thereof, and an outlet 46 is provided to remove these materials with the solvent through conduit 47.

It is to be understood that all materials admitted as slurry and removed in conjunction with the solvent must be pumped in order to obtain the proper flow of these solid suspensions.

In the above example, a light petroleum fraction was used. Petroleum ether, ethyl ether, gasoline, kerosene having a gravity of 41° and distilling at about 572° F., hexane, heptane, toluene, cyclohexane, cycloheptane, ethylacetate, benzene and mixtures of these materials may be used. Also alcohols, such as methyl, ethyl, isopropyl, amyl and n-butyl alcohol have proven satisfactory as well as certain halogenated solvents, such as Freon. Even melted fat or water can be used to separate the light from the heavy portion of this finely divided material.

While in accordance with the provisions of the statutes, there has been illustrated and described the best form of embodiment of this invention now known, it will be apparent to those skilled in the art that changes may be made in the form of the apparatus disclosed without departing from the spirit of this invention as set forth in the appended claims, and that in some cases certain features of this invention may be used to advantage without a corresponding use of other features.

What is claimed is:

1. A process for the separation of the constituents of dry rendered tankage, which comprises; finely dividing said material, mixing it with an organic fat solvent which has a density less than that of any constituents of said dry rendered tankage, passing the mixed solvent and solids into a tower near the bottom thereof at such a rate of flow that the rate of settling of the lighter constituent is less than the rate of flow of the solvent through the tower and the rate of settling of the heavy constituent is greater than the said rate of flow, thereby separating the heavy constituent at the bottom of the tower, and the lighter constituent at the top of the tower, constantly removing the solvent from each of these constituents, separating the fat from the solvent and recirculating the solvent portion.

2. A process as claimed in claim 1 in which said organic fat solvent is hexane.

3. A process as claimed in claim 1 wherein said organic solvent is a petroleum fraction distilling at a vapor temperature of about 572° F. and having the gravity of 41°.

References Cited in the file of this patent

UNITED STATES PATENTS

| | | |
|---|---|---|
| 2,536,345 | Bradford | Jan. 2, 1951 |
| 2,567,179 | Bonotto | Sept. 11, 1951 |
| 2,597,230 | Davis | May 20, 1952 |
| 2,619,425 | Levin | Nov. 25, 1952 |
| 2,730,538 | Brabets et al. | Jan. 10, 1956 |
| 2,940,965 | Garwin | June 14, 1960 |
| 3,099,561 | Thompson | July 30, 1963 |